(12) United States Patent  (10) Patent No.: US 12,281,288 B2
Dromgool et al.  (45) Date of Patent: Apr. 22, 2025

(54) SYSTEMS, DEVICES, AND METHODS FOR INTRODUCING ADDITIVES TO A PRESSURISED VESSEL

(71) Applicant: Natural Brew Inc, Charlottetown (CA)

(72) Inventors: Matthew Charles Dromgool, Charlottetown (CA); Brian Watson, Charlottetown (CA)

(73) Assignee: Natural Brew Inc, Charlottetown (CA)

( * ) Notice: Subject to any disclaimer, the term of this patent is extended or adjusted under 35 U.S.C. 154(b) by 526 days.

(21) Appl. No.: 17/739,520

(22) Filed: May 9, 2022

(65) Prior Publication Data

US 2022/0259529 A1  Aug. 18, 2022

Related U.S. Application Data

(63) Continuation of application No. 15/755,978, filed as application No. PCT/IB2016/055183 on Aug. 31, 2016, now Pat. No. 11,326,135.

(30) Foreign Application Priority Data

Sep. 1, 2015 (NZ) .......................... 711711

(51) Int. Cl.
*C12C 11/00* (2006.01)
*B01J 4/00* (2006.01)
(Continued)

(52) U.S. Cl.
CPC ............. *C12C 11/006* (2013.01); *B01J 4/008* (2013.01); *B01J 4/02* (2013.01); *C12C 7/06* (2013.01);
(Continued)

(58) Field of Classification Search
CPC ..... C12C 11/00; C12C 11/003; C12C 11/006; C12C 11/02; C12C 11/07; C12C 11/075;
(Continued)

(56) References Cited

U.S. PATENT DOCUMENTS 3,384,553 A  5/1968 Caslavsky et al.
3,959,120 A  5/1976 Pollock et al.
(Continued)

FOREIGN PATENT DOCUMENTS

DE  102006009612 A1  9/2007
GB  2123850 A  2/1984
(Continued)

OTHER PUBLICATIONS

International Search Report for International Patent Application No. PCT/IB2016/055183, dated Jan. 13, 2017.
(Continued)

*Primary Examiner* — Hung D Nguyen
(74) *Attorney, Agent, or Firm* — Bradley Arant Boult Cummings LLP; Henry B. Ward, III

(57) ABSTRACT

An additive dispensing device for dispensing of additives into a pressurised vessel, more particularly a fermentation vessel of a brewing system, is disclosed. The device has a vessel body including a chamber, the chamber having a closed end and an open end. A pressure release means is provided between the chamber and atmosphere. A controllable valve positioned between the closed end and the open end, configured to selectively open and close a flow path between the closed end and the open end.

6 Claims, 6 Drawing Sheets

(51) Int. Cl.
  *B01J 4/02* (2006.01)
  *C12C 7/06* (2006.01)
  *C12C 11/02* (2006.01)
  *C12C 11/11* (2019.01)
  *C12C 13/02* (2006.01)
  *C12C 13/10* (2006.01)
  *C12L 3/00* (2006.01)

(52) U.S. Cl.
  CPC ............... *C12C 11/02* (2013.01); *C12C 11/11* (2013.01); *C12C 13/02* (2013.01); *C12C 13/10* (2013.01); *C12L 3/00* (2013.01)

(58) Field of Classification Search
  CPC ......... C12C 11/11; C12C 13/00; C12C 13/02; C12C 13/10; C12C 7/06; C12L 3/00; B01J 4/008; B01J 4/02
  See application file for complete search history.

(56) References Cited

U.S. PATENT DOCUMENTS

| | | |
|---|---|---|
| 4,773,315 A | 9/1988 | Enenkel |
| 4,856,421 A | 8/1989 | Whitford |
| 5,573,142 A | 11/1996 | Morellato et al. |
| 6,631,732 B1 | 10/2003 | Koster et al. |
| 2004/0031392 A1* | 2/2004 | Belkin ............... C12C 11/003 99/275 |
| 2007/0056994 A1 | 3/2007 | Woodnorth et al. |
| 2012/0104025 A1 | 5/2012 | Anselmino et al. |
| 2012/0237654 A1* | 9/2012 | Roth ...................... C12C 13/00 99/278 |
| 2014/0234482 A1* | 8/2014 | Kempfert ............... C12C 13/10 99/278 |
| 2015/0000532 A1 | 1/2015 | Mitchell et al. |
| 2015/0105738 A1 | 4/2015 | Mehta |
| 2015/0329808 A1* | 11/2015 | Ramsey .................. C12C 13/10 99/276 |
| 2016/0326471 A1* | 11/2016 | Aown ..................... C12C 13/10 |
| 2022/0186161 A1* | 6/2022 | Toombs ................. C12C 13/10 |

FOREIGN PATENT DOCUMENTS

| | | |
|---|---|---|
| GB | 2146705 A | 4/1985 |
| WO | 2012131475 A | 10/2012 |

OTHER PUBLICATIONS

Written Opinion for International Patent Application No. PCT/IB2016/055183, dated Jan. 13, 2017.

* cited by examiner

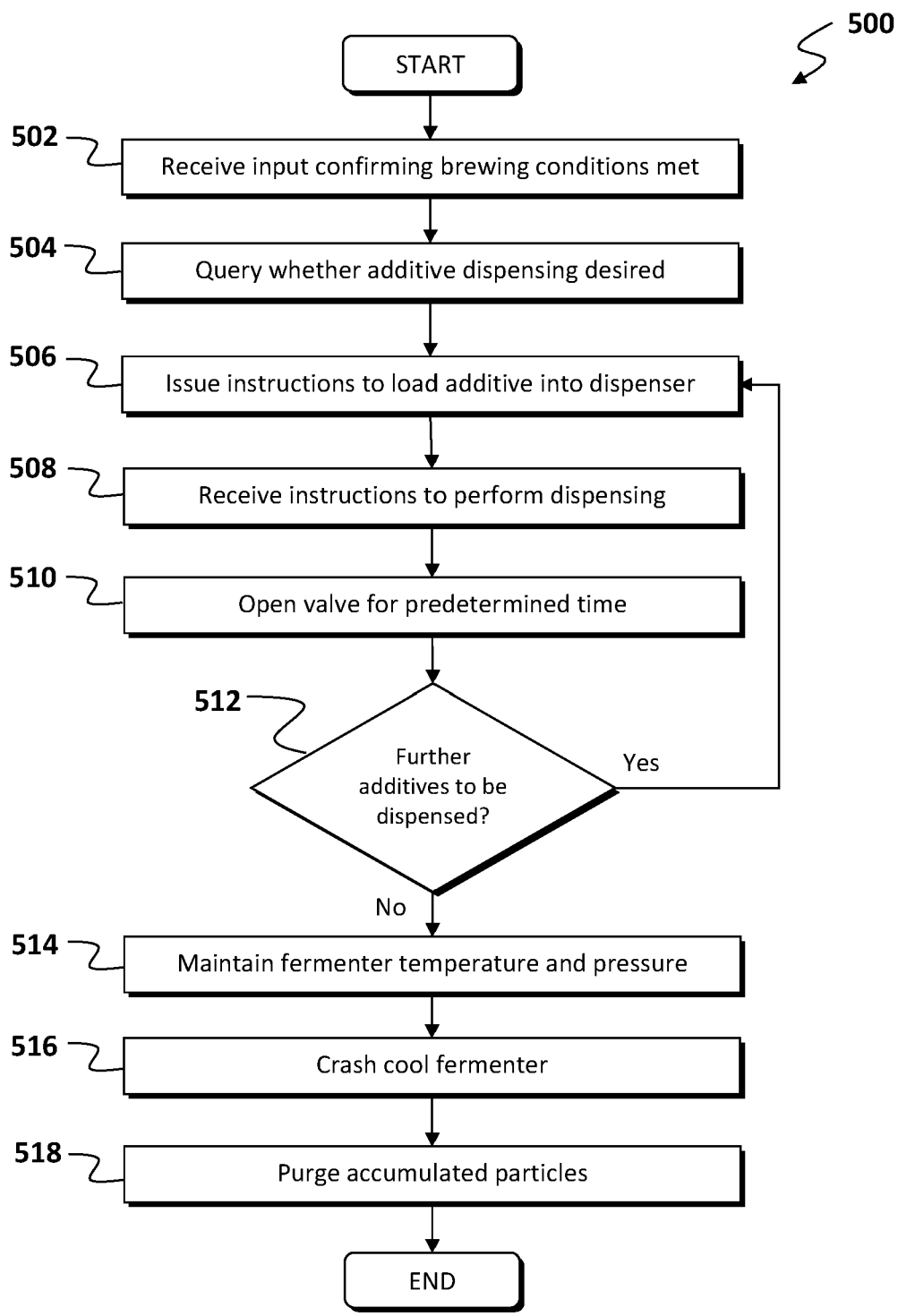

SYSTEMS, DEVICES, AND METHODS FOR INTRODUCING ADDITIVES TO A PRESSURISED VESSEL

CROSS-REFERENCE TO PRIORITY APPLICATION

This application is a continuation of U.S. patent application Ser. No. 15/755,978 for SYSTEMS, DEVICES, AND METHODS FOR INTRODUCING ADDITIVES TO A PRESSURISED VESSEL, filed Feb. 27, 2018, which itself claims the benefit of PCT Patent Application No. PCT/IB2016/055183 for SYSTEMS, DEVICES, AND METHODS FOR INTRODUCING ADDITIVES TO A PRESSURISED VESSEL, filed Aug. 31, 2016, which itself claims the benefit of New Zealand Patent Application No. 711711 for SYSTEMS, DEVICES, AND METHODS FOR INTRODUCING ADDITIVES TO A PRESSURISED VESSEL, filed Sep. 1, 2015. Each of the foregoing patent applications and publication is hereby incorporated by reference in its entirety.

TECHNICAL FIELD

Embodiments of the disclosure relate to systems, methods, and devices for introducing additives into a pressurised vessel—more particularly the introduction of hops into a fermentation vessel.

BACKGROUND

Traditionally, restaurants and pubs have purchased beer from a brewery, which is then shipped to the business for sale. However, there is an increasing demand by consumers for variation in taste or style from the offerings of large scale breweries, and also freshness of the product. Some businesses have established brewing facilities on site to service these demands.

However, it is widely recognised that the production of high quality beer requires careful adherence to processes in order to achieve a consistent product. Further, the capital and ongoing costs associated with traditional brewing processes and systems (which require constant monitoring and input by a brewer) are not feasible for many businesses.

PCT Patent Application No. PCT/IB2012/000624 describes a system automating the brewing process in a relatively small scale—monitoring fermentation, maturation, and carbonation to prepare the beer (or other fermented beverage) for dispensing.

It is an object of the present invention to improve on existing offerings, or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

SUMMARY

According to one aspect of the present disclosure there is provided an additive dispensing device. The dispensing device may include a vessel body including a chamber, the chamber having a closed end and an open end. The dispensing device may include a pressure release means between the chamber and atmosphere. The dispensing device may include a controllable valve positioned between the closed end and the open end, configured to selectively open and close a flow path between the closed end and the open end.

According to one aspect of the present disclosure there is provided a brewing system. The brewing system may include a fermentation vessel. The brewing system may include an additive dispensing device. The dispensing device may include a vessel body including a chamber, the chamber having a closed end and an open end, wherein the open end opens into the fermentation vessel. The dispensing device may include a pressure release means between the chamber and atmosphere. The dispensing device may include a controllable valve positioned between the closed end and the open end, configured to selectively open and close a flow path between the chamber and the fermentation vessel.

According to one aspect of the present disclosure there is provided a method of dispensing additives into a fermentation vessel of a brewing system, the brewing system including an additive dispensing device including a vessel body including a chamber, the chamber having a closed end and an open end, wherein the open end opens into the fermentation vessel, a pressure release means between the chamber and atmosphere, and a controllable valve positioned between the closed end and the open end, configured to selectively open and close a flow path between the chamber and the fermentation vessel. The method may include receiving confirmation of fermentation within the fermentation vessel being completed. The method may include receiving input indicating additives are to be dispensed into the fermentation vessel. The method may include receiving confirmation of additives being placed in chamber. The method may include controlling the controllable valve to open a flow path between the chamber and the fermentation vessel.

According to one aspect of the present disclosure there is provided a method of dispensing additives into a fermentation vessel of a brewing system, the brewing system including an additive dispensing device including a vessel body including a chamber, the chamber having a closed end and an open end, wherein the open end opens into the fermentation vessel, a pressure release means between the chamber and atmosphere, and a controllable valve positioned between the closed end and the open end, configured to selectively open and close a flow path between the chamber and the fermentation vessel. The method may include monitoring at least one condition associated with fermentation of a beverage in the fermentation vessel. The method may include determining that additives are to be dispensed into the fermentation vessel based on the at least one condition. The method may include controlling the controllable valve to open a flow path between the chamber and the fermentation vessel.

Reference will herein be made to the fermented beverage produced by the brewing system being beer. However, it should be appreciated that this is not intended to be limiting, and that in exemplary embodiments other fermented beverages may be produced—for example cider.

It is envisaged that the present disclosure may have particular application to the dispensing of additives into a pressurised fermentation vessel. During fermentation of beer, carbon dioxide ($CO_2$) development of the beverage in the fermentation vessel builds pressure within the vessel. While exact levels may vary depending on the beverage being fermented, this pressure may be in the order of 1 to 2 bar.

Maintenance of pressure levels may be desirable in order to avoid compromising fermentation, or subsequent carbonation of the beverage. Further, it may be useful to reduce exposure to environmental conditions outside the fermentation vessel in the interests of maintaining stability of the beverage and sanitation of the vessel.

However, certain additives should ideally be introduced to the beverage at this stage in order to achieve desired flavours. The additive dispensing device of the present disclosure enables the introduction of additives with minimal exposure to atmospheric pressure and associated environmental effects. It should be appreciated that while it is envisaged that the present disclosure has particular application to fermentation vessels in which primary and/or secondary fermentation occurs, the additive dispensing device may be used in other pressurised vessels of a brewing system in which pressure is maintained above atmosphere and it is desirable to introduce additives.

It should be appreciated that the additives dispensed into the fermentation vessel using the additive dispensing device may be any known in the art, such as hops, finings, backsweeteners, fruit pulp, fruit peel, or spices.

It is envisaged that the present disclosure may have particular application to the addition of solid particulate matter—for example dry hops. Dry hopping refers to the introduction of hops to the beverage after cooling of the wort—i.e. during or after fermentation. This is a relatively recent development in brewing. The addition of hops after the boiling means that they do not impart bitterness, but provide hop flavour, and more importantly, hop aroma. Care must be taken to remove these hops after a certain timeframe so as not to impart harsh astringent characters into the beer.

It is envisaged that the rapid in-flow of pressurised gas from the fermentation vessel due to the pressure differential may assist in breaking up the particulate matter which has potentially settled (whether in the chamber or during storage), and thereby increase distribution and/or exposure of the additive—in the case of dry hopping for extraction of oils from the hops.

Dry hopping regimes vary from brewery to brewery. In an exemplary embodiment dry hopping may be scheduled by an operator once the fermentation specific gravity reaches the terminal gravity—measured, for example, using a hydrometer. Using the device of the present disclosure, at this stage the hops are added by opening the flow path. As the valve opens, the $CO_2$ rushes into the chamber and breaks up the hops, allowing them to drop into the liquid.

The action of dropping the hops into the warm (for example approximately 20 degrees) carbonated liquids may create carbonation sites which cause the product to foam. In some configurations, if no allowance is made for the internal pressure of the vessel, then product may eject from the port with great force. The beer may then be left in contact with the hops for a period of 24-48 hours, and then cooled to 2 degrees Celsius for maturation.

However, it should be appreciated that description of the use of solid particulate matter with the additive dispensing device is not intended to be limiting. For example, in an exemplary embodiment the additive dispensing device may be used to dispense finings into the fermentation tank, which are typically liquid in form. Finings can be used to form a precipitate with organic compounds such as proteins, tannins, yeast cells to encourage settling of this precipitate in the bottom of the vessel which then can be removed. In some circumstances the desired effect may be achieved standing the beverage over an extended period to allow settling to occur. However this may not be suitable in all cases, whether considering the shelf-life of the beverage or the commercial implications of increasing production times and maintaining an extended inventory.

It is envisaged that the rapid in-flow of pressurised gas from the fermentation vessel due to the pressure differential may assist spraying the finings into the vessel, thereby increasing distribution and therefore likely efficacy of the finings. In an exemplary embodiment the contents of the fermentation vessel may be agitated on adding of the finings (for example a stream of $CO_2$ from a source of pressurised $CO_2$)—whether manually or as an automated response to activation of the additive dispensing device. However, it is anticipated that such agitation may be unnecessary due to the distribution of the finings as it bursts from the device.

In an exemplary embodiment, in use the additive dispensing device may be oriented such that the open end faces downwardly. It is envisaged that this may assist in gravitational feeding of the additives from the chamber into the fermentation vessel. The additive dispensing device may also be secured substantially toward the top of the fermentation vessel above the liquid filling level.

In an exemplary embodiment, the additive dispensing device may include a releasable access into the chamber, for the introduction of the additive(s) into the chamber. For example, the vessel body may include a removable cap at the closed end. The cap may be releasably secured to the vessel body using any suitable means known in the art—for example, complementary helical threads on the cap and the body, push lock, or a hinged configuration with a clip.

A purpose of the pressure release means is to release pressure from the chamber after opening of the controllable valve and therefore pressurisation by the fermentation vessel. In doing so, it is envisaged that the chamber may be equalised with atmosphere, and therefore prevent the operator being exposed to expulsion of pressurised fluid and/or additives through the releasable access the next time filling of the chamber with additives is required.

Further, the pressure release means releases pressure from the fermenter during the process of hop addition—i.e. while the chamber is fluidly connected to the vessel. This may assist in reducing the likelihood of significant foaming of the beer occurring and being ejected from the open port. It should be appreciated that a balance is to be struck between a sufficiently fast release of pressure from the chamber, but limiting the loss of desirable $CO_2$ pressure during dosing causing significant foaming of the beer.

While it should be appreciated that any suitable pressure release means known in the art may be used, it is envisaged that static means of releasing pressure may be preferable over valves having moving parts which introduce additional cost and a higher risk of failure.

In an exemplary embodiment, the pressure release means may be a pressure release aperture between the chamber and atmosphere. For example, the diameter of the pressure release aperture may be in the range of 1 to 5 mm. In an exemplary embodiment the diameter of the pressure release aperture may be substantially 2 mm. It is envisaged that this may provide a suitable rate of pressure release, while limiting the likelihood of fluid flow being diverted from expelling the additive from the chamber.

In an exemplary embodiment, an opening of the pressure release aperture into the chamber may be occluded from direct exposure to the open end of the chamber. In doing so, the likelihood of additive being expelled through the aperture may be reduced—particularly where the additive is liquid or a fine particulate in form.

For example, in an exemplary embodiment, the opening into the chamber may face away from the open end of the chamber. This may be achieved for example, using a conduit extending from the aperture into the chamber, and bending around such that its end (i.e. the opening) faces away from the open end. In another embodiment a cover may be provided over the opening, providing at least one lateral flow path to the aperture—for example, a bolt having a conduit through its shaft, and one or more lateral openings below the head of the bolt and intersecting the conduit through the shaft.

In an exemplary embodiment, the means for providing the opening of the pressure release aperture may be static. However, in an exemplary embodiment it is envisaged that the opening may be closed, or at least blocked to a greater extent, during the initial pressurisation of the chamber. For example, the exemplary conduit or bolt described above may be configured to be pushed towards the cap until closing of the valve. In an exemplary embodiment a biasing mechanism, such as a spring, may be provided to return the conduit or bolt once the valve is closed.

In an exemplary embodiment, the pressure release means may be provided by an allowance gap between components of the vessel body. For example, in exemplary embodiments in which the cap is threadably secured to the vessel body, the pressure release means may be an allowance gap between the threads between the cap and the vessel body.

It should be appreciated that the controllable valve may be any suitable device for controllably sealing the chamber from the fermentation vessel. Numerous valves and means for control are known in the art—however, there are certain arrangements which are envisaged as being particularly suited to the context of the present disclosure.

For example, it is envisaged that the control valve may be pneumatically controlled. Pneumatic controls provide for relatively high forces to be exerted, without requiring a high current draw which could have a number of implications for the complexity and cost of the system.

In an exemplary embodiment, the controllable valve may produce two adjacent apertures between the closed end and the open end when in an open state. It is envisaged that this may assist in directing the flow of pressurised fluid from the fermentation vessel through one aperture and up a side of the chamber, before blowing the additives through the other aperture.

For example, the controllable valve may be a butterfly valve. It is envisaged that the rotating action of the disk of the butterfly valve may produce a funnelling effect to encourage the flow of pressurised gas from the fermentation vessel up one side of the chamber as described above.

In an exemplary embodiment, activation of the controllable valve may be automated. For example, a controller of the brewing system may issue an alert to an operator that additives should be dispensed into the fermentation vessel based on current conditions (as described previously). The operator may add the additives to the chamber, and confirm to the controller that this action has been performed. The controller may then open the controllable valve at a suitable point in time, depending on the programming for that beverage.

However, it should be appreciated that this is not intended to be limiting, and in an exemplary embodiment the controllable valve may be manually activated.

In an exemplary embodiment, control means for operation of the controllable valve may be located remotely from the additive dispensing device. It is envisaged that this may encourage safe practices by reducing the likelihood of the valve being opened while the operator is within the vicinity of the additive dispensing device.

In an exemplary embodiment, the additive dispensing device may include a sensor for determining closure of the releasable access. The sensor may be a contact sensor, or a non-contact sensor (such as a reed switch or Hall-effect sensor). In such an embodiment, opening of the controllable valve may be disabled while the releasable access is open or unsecured.

In an exemplary embodiment, the additive dispensing device may include a pressure sensor for determining pressure within the chamber. An alert may be issued—for example at a control panel of the system, or using dedicated devices at the additive dispensing device—to alert an operator of high pressure levels before they open the chamber. This may also be used to detect blockage of the pressure release means in the event that pressure levels do not drop following closure of the valve.

In an exemplary embodiment the vessel body may be removable from the controllable valve, to assist in cleaning of the device.

In an exemplary embodiment the vessel body may include at least a portion made of a transparent material to enable visual inspection of the contents of the chamber. For example, the vessel body may be made of a transparent material, or the vessel body may include a transparent strip between its ends.

For a firmware and/or software (also known as a computer program) implementation, the techniques of the present disclosure may be implemented as instructions (for example, procedures, functions, and so on) that perform the functions described. It should be appreciated that the present disclosure is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present disclosure may be embodied directly in hardware, in a software module executed by one or more processors, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

BRIEF DESCRIPTION OF DRAWINGS

Further aspects of the present invention will become apparent from the following description which is given by way of example only and with reference to the accompanying drawings in which:

FIG. 5 is flow chart of a method of operating the exemplary brewing system.

DETAILED DESCRIPTION

Figure 1:
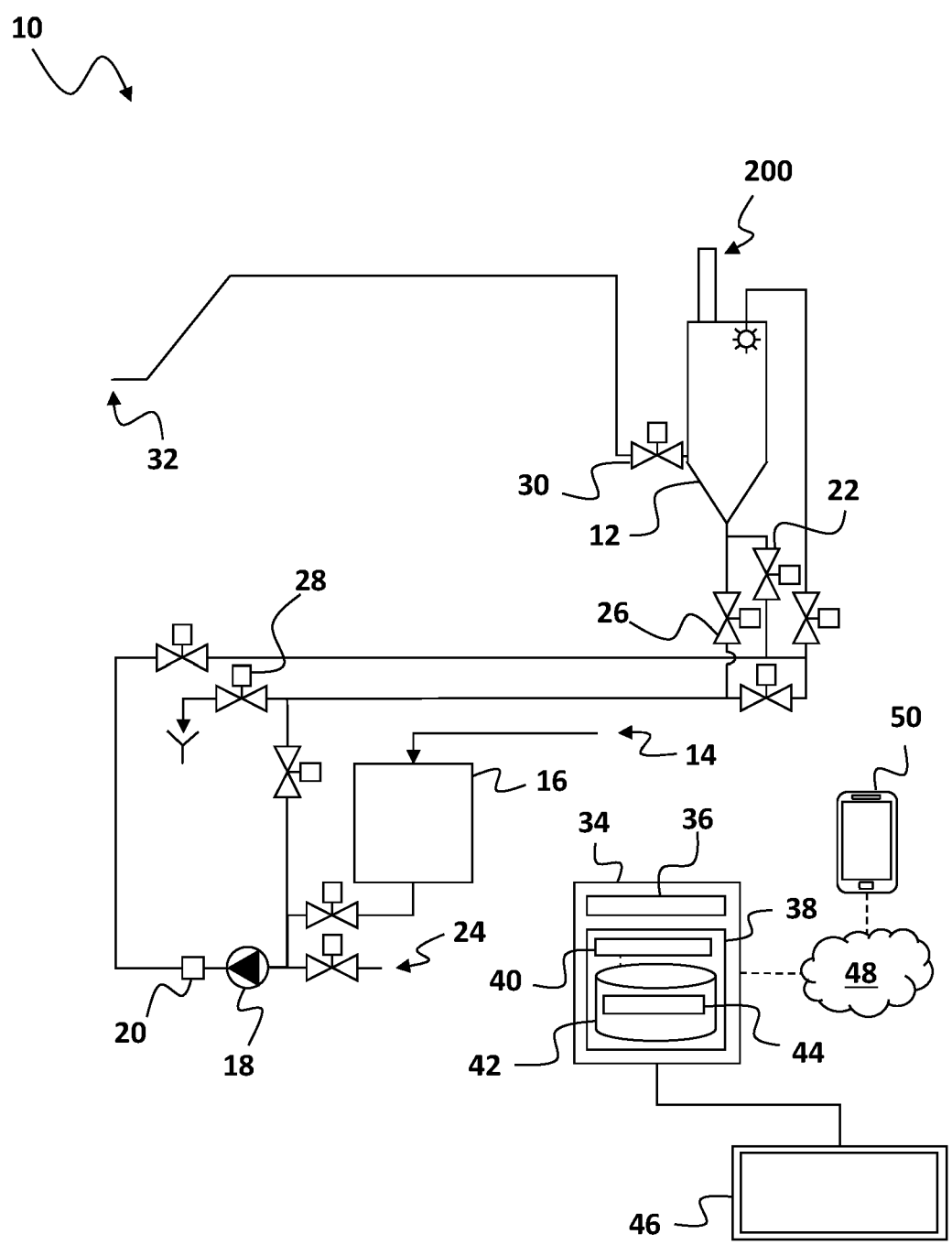
FIG. 1 is a schematic diagram of an exemplary brewing system in accordance with an embodiment of the present disclosure.

FIG. 1 presents a schematic diagram of a brewing system 10. The brewing system 10 includes a fermentation vessel (herein referred to as the "fermenter 12") in which ingredients of a fermented beverage are mixed, fermented under controlled conditions, and subsequently dispensed from. It should be appreciated that while the system 10 may be described herein in relation to the production of beer, it should be appreciated that this is not intended to be limiting and may be used for the production of other fermented beverages.

Water is supplied to the fermenter 12 from a water supply 14, heated to temperature in a temperature controlled tank 16. The water is pumped using pump 18, with flow being monitored by flow meter 20. Ingress into the fermenter 12 is achieved via fermenter inlet valve 22.

In operation, wort is supplied to the fermenter 12 via a wort supply connection 24, pumped and monitored using pump 18 and flow meter 20 respectively. Once the wort transfer is completed, water is pumped into the fermenter 12 from the tank 16.

Yeast is then pitched into the fermenter 12 and fermentation begins. During fermentation, carbon dioxide ($CO_2$) is produced as a by-product, and utilised to naturally carbonate the beer as it is fermenting. It should be appreciated that the present disclosure is not limited to use in systems utilising natural carbonation—for example, a dedicated $CO_2$ supply may be used to control pressure levels through introduction of $CO_2$. When fermentation is complete, the fermenter 12 is cooled, causing yeast to fall out of suspension. Accumulated yeast is drained off the bottom of the fermenter 12 through the fermenter drain valve 26 to drain 28.

Naturally clear beer is then dispensed directly from a fermenter outlet valve 30 to a dispensing outlet 32—whether serving taps at a bar, or a filling outlet.

It should be appreciated that unlabelled valves and piping shown in FIG. 1 facilitate Clean in Place (CIP) and Sanitize in Place (SIP)—during which the pump 18 will cycle cleaning and sanitizing chemicals with heated water through the fermenter 12 via spray balls to ensure effective cleaning of the system 10.

Control of the system 10 is performed by controller 34. The controller 34 has a processor 36, memory 38, and other components typically present in such computing devices. In the exemplary embodiment illustrated the memory 38 stores information accessible by processor 36, the information including instructions 40 that may be executed by the processor 36 and data 42 that may be retrieved, manipulated or stored by the processor 36. The memory 38 may be of any suitable means known in the art, capable of storing information in a manner accessible by the processor 36, including a computer-readable medium, or other medium that stores data that may be read with the aid of an electronic device.

The processor 36 may be any suitable device known to a person skilled in the art. Although the processor 36 and memory 38 are illustrated as being within a single unit, it should be appreciated that this is not intended to be limiting, and that the functionality of each as herein described may be performed by multiple processors and memories, that may or may not be remote from each other.

The instructions 40 may include any set of instructions suitable for execution by the processor 36. For example, the instructions 40 may be stored as computer code on the computer-readable medium. The instructions may be stored in any suitable computer language or format.

Data 42 may be retrieved, stored or modified by processor 36 in accordance with the instructions 40. The data 42 may also be formatted in any suitable computer readable format. Again, while the data is illustrated as being contained at a single location, it should be appreciated that this is not intended to be limiting—the data may be stored in multiple memories or locations.

The data 42 stored on server may include a record 44 of control routines for the system 10. For example, different routines may be provided for the production of different beverages—or styles or variations thereof.

A user interface 46 enables communication to and from the controller 34 with regard to the brewing process. It is also envisaged that the controller 34 may communicate over a network 22 with a user device 50 (for example a mobile phone) to provide details of the current status of the system 10 and effectively operate as a remote user interface. The network 22 potentially comprising various configurations and protocols including the Internet, intranets, virtual private networks, wide area networks, local networks, private networks using communication protocols proprietary to one or more companies—whether wired or wireless, or a combination thereof.

An additive dispensing device (herein referred to as "the dispenser 200") is also connected to the fermenter 12, further details of which will be described below.

Figure 2A:
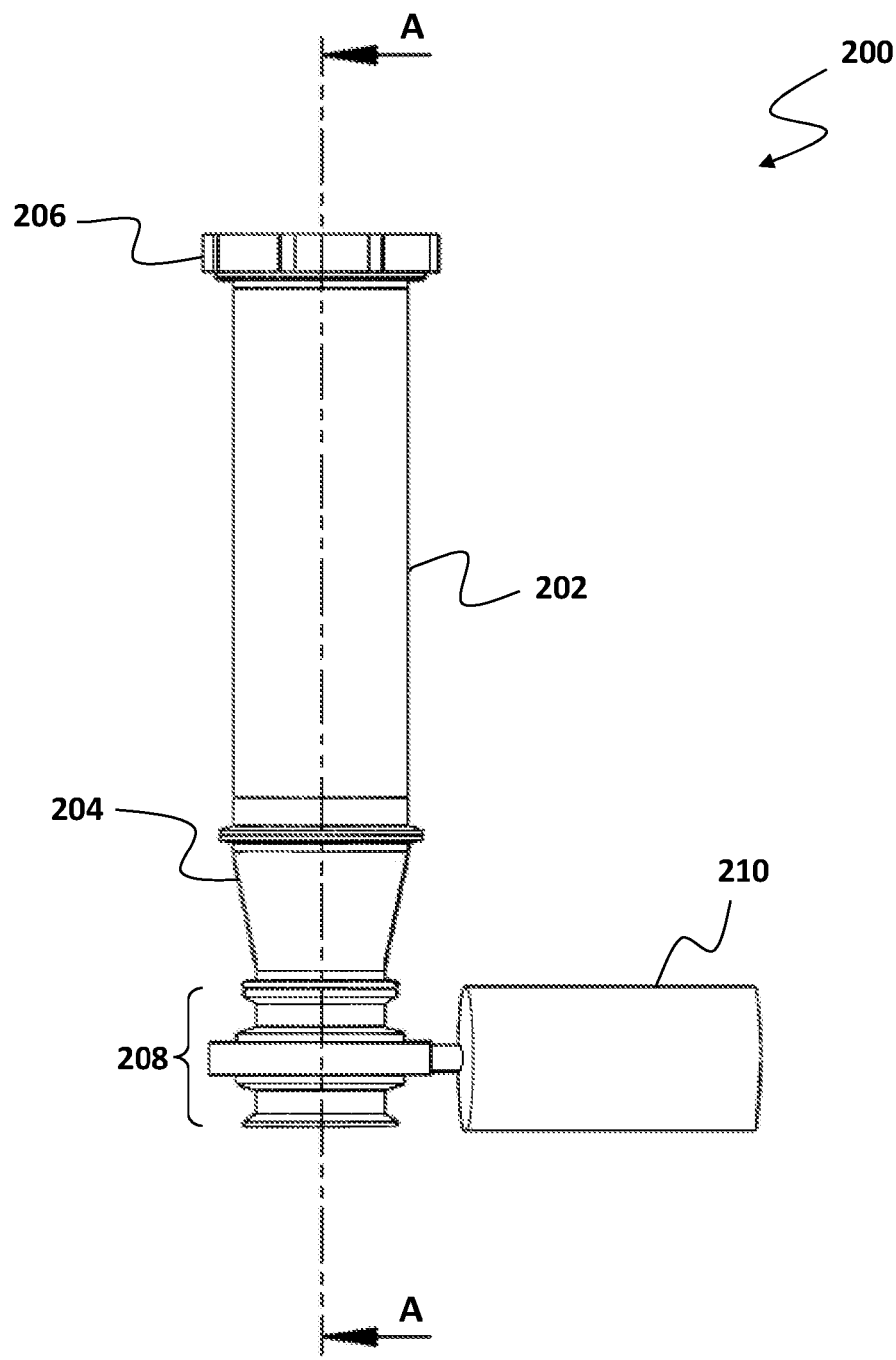
FIG. 2A is a side view of an exemplary additive dispensing device in accordance with an embodiment of the present disclosure.

FIG. 2A shows the exterior of the dispenser 200. The dispenser 200 includes a tubular body 202 with a conical end section 204, and a cap 206 secured to the distal end of the body 202 using complementary screw threads. A butterfly valve 208 is located at the conical end section 204, having a pneumatic actuator controlled by controller 34 of FIG. 1.

Figure 2B:
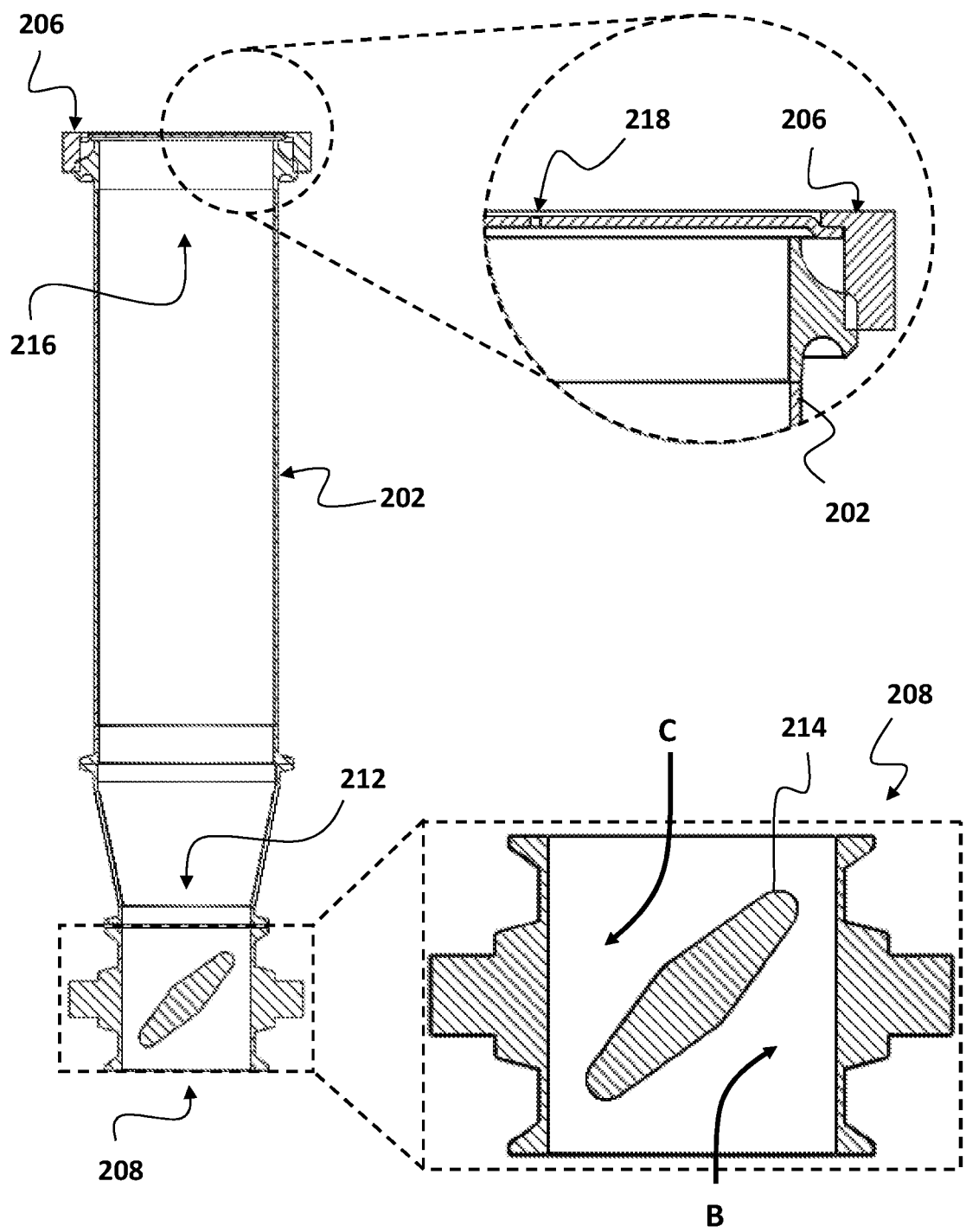
FIG. 2B is cross-sectional side view of the exemplary additive dispensing device in accordance with an embodiment of the present disclosure.

FIG. 2B shows a cross-sectional view of the dispenser 200 along axis A (seen in FIG. 2A). In use, the cap 206 is removed and dry hops (or another additive such as finings) introduced into the chamber of the body 202 by an operator, before reapplying the cap 206. Operation of the butterfly valve 208 controls exposure of the open end 212 of the body 202 to the interior of fermenter 12 (not show here, but see FIG. 1).

On rotation of the disc 214 of the butterfly valve 208 into an open position, pressurised $CO_2$ from the fermenter 12 flows through one side of the valve 208 in a first direction B, and up one side of the chamber, before being redirected back down from the closed end 216 to blow the hops through the other side of the valve 208 in a second direction C.

On closing of the butterfly valve 208, the chamber would be pressurised to substantially that of the fermenter 12, being much smaller in volume than the headspace of the fermenter 12. To enable the chamber to return to atmospheric pressure, a pressure release aperture 218 is provided in the cap 206. In an exemplary embodiment the pressure release aperture 218 is substantially 2 mm in diameter—sufficient to enable rapid bleeding of pressure, without compromising the flushing action achieved by the pressure differential between the fermenter 12 and the dispenser 200.

Figure 3A:
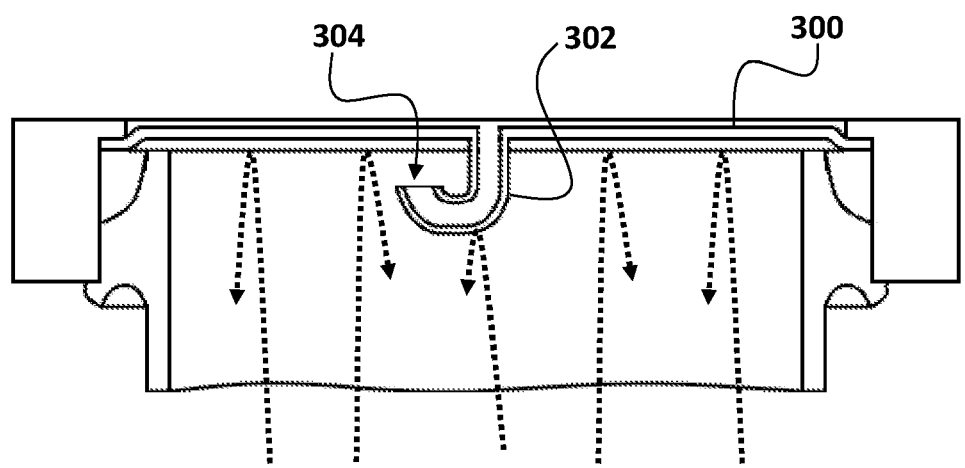
FIG. 3A is cross-sectional side view of an embodiment of a pressure release means of the exemplary additive dispensing device.

FIG. 3A illustrates an alternative cap 300 for use with the dispenser 200. In this embodiment the pressure release aperture is provided in the form of a "J" shaped conduit 302. The conduit 302 has an opening 304 facing towards the cap 300, away from the valve (for example, butterfly valve 208 shown in FIG. 2B). This reduces the likelihood of the additive (illustrated by dashed lines) striking the opening 304 directly following the initial in-rush of $CO_2$.

Figure 3B:
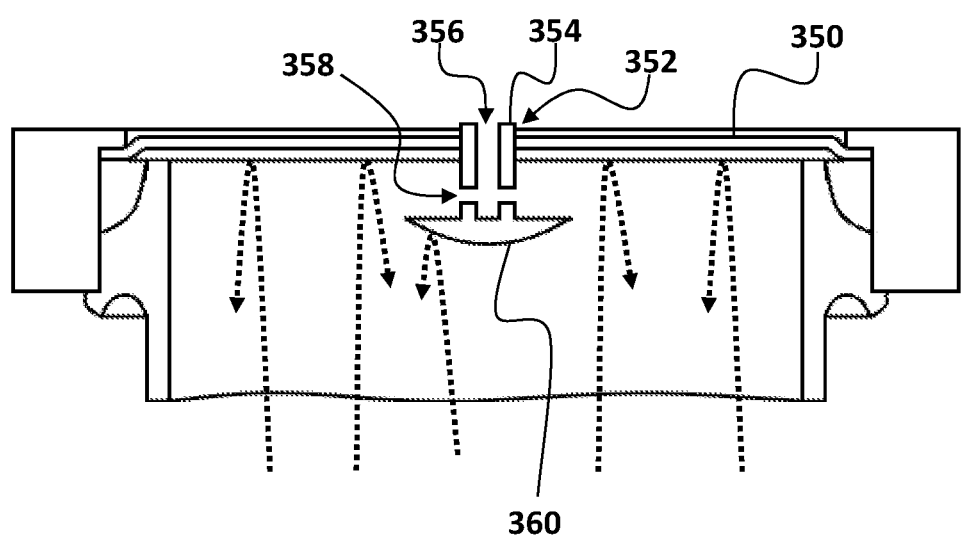
FIG. 3B is cross-sectional side view of another embodiment of a pressure release means of the exemplary additive dispensing device.

FIG. 3B illustrates an alternative cap 350 for use with the dispenser 200. In this embodiment the pressure release aperture is provided in the form of a bolt 352, having a shaft 354 with a central bore 356 intersected by two lateral openings 358 below a mushroom head 360. The head 360 protects the lateral openings 358 against the initial pushing of the additive against the cap 350 (illustrated by dashed lines). In exemplary embodiments the shaft 354 may have external threads engaging with the cap 350 to fix it in place. Alternatively, the bolt 352 may be configured to slide relative to the cap 350, with the initial pressurisation of the chamber pushing the bolt 352 up to block the lateral openings 358.

Figure 4:
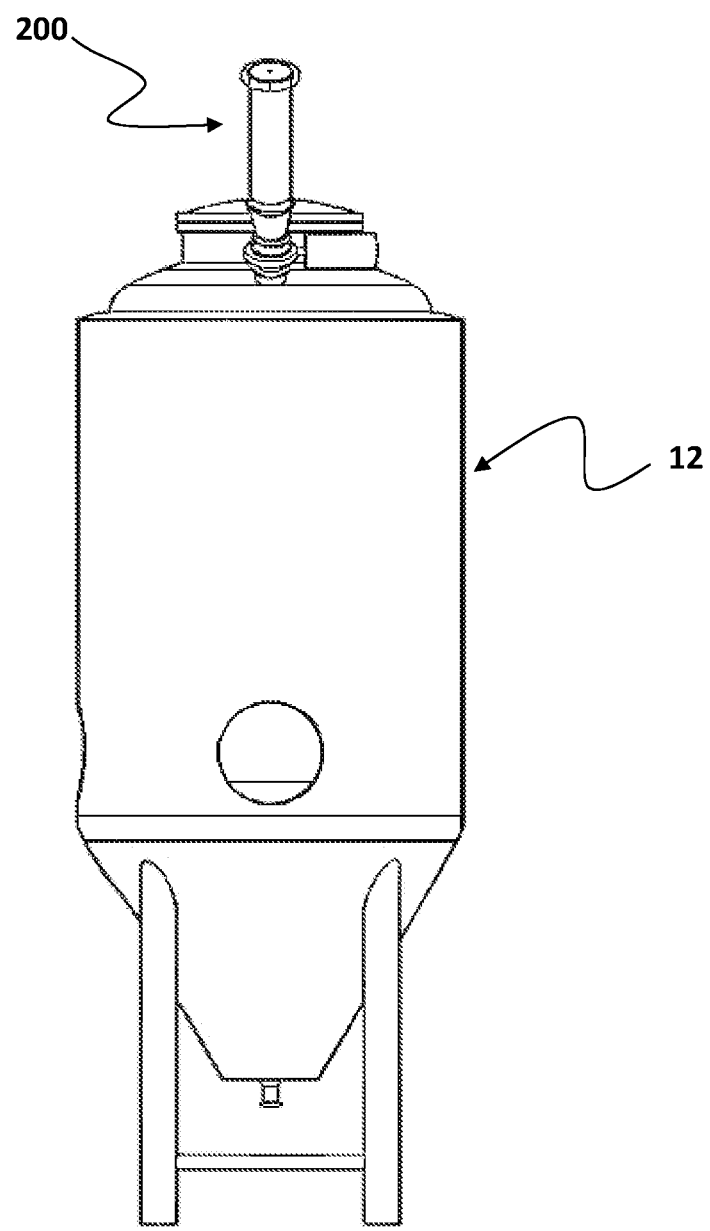
FIG. 4 is side view of the exemplary additive dispensing device connected to an exemplary fermentation vessel in accordance with an embodiment of the present disclosure.

FIG. 4 shows the dispenser 200 mounted to the top of the fermenter 12 in a substantially upright orientation pointing towards the centre of the fermenter 12. This is envisaged as encouraging the flushing action with gravitational feed, and distribution of the additive across a wide area of the surface of the beverage.

FIG. 5 shows a method 500 performed by the controller 34 in operating the brewing system 10. The method 500 is described with reference to the introduction of dry hops to the fermenter 12—but it should be appreciated that the process may equally be applied to the introduction of other types of additive (at an appropriate stage in the brewing process).

In step 502, the controller 34 receives input from an operator via user interface 46 confirming that fermentation is complete—determined, for example, through readings of the beer's specific gravity. In an alternate embodiment the controller 34 may determine completion of fermentation through monitoring conditions of the beverage.

In step 504 the controller 34 issues a query to the operator via user interface 46 as to whether dry hopping is desired. Where the user replies to the affirmative, in step 506 the controller 34 issues instructions via user interface 46 to load dry hopping matter into the chamber of the body 202. The volume and type of hops may be, for example, dictated by the brew sheet for the beer.

In step 508 the controller 34 receives confirmation via user interface 46 to perform dry hopping. Requiring such confirmation via the user interface 46 ensures the operator is removed from the immediate vicinity of the dispenser 200 while it is pressurised. On confirmation, the butterfly valve 208 is opened for a predetermined period of time—for example, approximately 10 seconds—in step 510. On closure of the butterfly valve 208 the pressure within the dispenser 200 is released, to prepare the dispenser 200 for subsequent use.

In step 512 the controller 34 issues a query to the operator via user interface 46 as to whether further hops are to be added. If so, steps 506 to 510 are repeated.

Once the addition of dry hops is confirmed as being completed, in step 514 the controller 34 maintains the temperature and pressure within the fermenter 12 for a predetermined period of time—for example in the order of 24 to 48 hours. After this time has elapsed, in step 516 the controller 34 rapidly reduces the temperature in the fermenter 12 (known as "crash cooling" in the art). This causes the floating yeast and hop particles to fall out of suspension to the bottom of the fermenter 12. Once the target temperature for maturation (for example 2 degrees Celsius) is reached, in step 418, the controller 34 controls the fermenter drain valve 26 to purge accumulated yeast and hop particles from the fermenter 12.

In exemplary embodiments in which the introduction of finings is desired for adjust characteristics of the beverage (such as clarity, flavour, aroma or colour), the dispenser 200 may be used to introduce finings at an appropriate stage of the process. For example, finings may be introduced before or after the crash cooling described above. As described in relation to dry hopping, the controller 34 may be configured to query the operator as to whether finings should be introduced, issue instructions, and control the dispenser 200 on input from the operator.

In exemplary embodiments in which back sweetening is desired, for example during the production of a cider, the dispenser 200 may be used to introduce sweetener such as liquid sugar or fruit juice. This may be performed at the end of fermentation as determined, for example, through readings of the cider's specific gravity and $CO_2$ and alcohol development—and after cooling to a temperature such that re-fermentation does not occur on the addition of a fermentable sugar. As described in relation to dry hopping, the controller 34 may be configured to query the operator as to whether back sweetening is desired, issue instructions, and control the dispenser 200 on input from the operator.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

The invention claimed is:

1. A brewing system, comprising:
   at least one pump;
   a temperature controllable fermentation vessel;
   an additive dispensing device mounted to the fermentation vessel, the additive dispensing device comprising a vessel body including a chamber, wherein the additive dispensing device is configured to selectively open and close a flow path between the chamber and the fermentation vessel;
   a controller configured to:
   control transfer of wort from a wort supply connection to the fermentation vessel by operating the pump;
   control transfer of water from a water supply to the fermentation vessel by operating the pump;
   receive an indication of completion of fermentation of a beverage;
   issue a query to a user via a user interface as to whether additives are to be added to the fermentation vessel;
   receive confirmation via the user interface to perform release of additives; and
   control the additive dispensing device to open the chamber to the fermentation vessel.

2. The brewing system of claim 1, wherein the controller is configured to monitor at least one condition associated with fermentation of the beverage in the fermentation vessel, and determine completion of fermentation based on the at least one condition.

3. The brewing system of claim 1, wherein the controller is configured to maintain temperature and pressure in the fermentation vessel for a predetermined period of time following opening of the chamber to the fermentation vessel.

4. The brewing system of claim 3, wherein the controller is configured to reduce the temperature in the fermentation vessel once the predetermined period of time has elapsed.

5. The brewing system of claim 4, wherein the controller is configured to operate a drain valve to purge a portion of the contents of the fermentation vessel once a target temperature is reached.

6. The brewing system of claim 1, wherein the controller is configured to the control the pump to cycle cleaning and sanitizing chemicals with heated water through the fermentation vessel on completion of dispensing of the beverage.

* * * * *